United States Patent
Onimatsu (10) Patent No.: US 9,566,737 B2
(45) Date of Patent: Feb. 14, 2017

(54) RUBBER EXTRUSION DEVICE

(71) Applicant: SUMITOMO RUBBER INDUSTRIES LTD., Kobe-shi, Hyogo (JP)

(72) Inventor: Hiroyuki Onimatsu, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 0 days.

(21) Appl. No.: 14/420,703

(22) PCT Filed: Aug. 30, 2013

(86) PCT No.: PCT/JP2013/073401
§ 371 (c)(1),
(2) Date: Feb. 10, 2015

(87) PCT Pub. No.: WO2014/034886
PCT Pub. Date: Mar. 6, 2014

(65) Prior Publication Data
US 2015/0231810 A1 Aug. 20, 2015

(30) Foreign Application Priority Data

Sep. 3, 2012 (JP) ................................ 2012-193401

(51) Int. Cl.
  *B29C 47/36* (2006.01)
  *B29K 21/00* (2006.01)
  *B29L 31/00* (2006.01)

(52) U.S. Cl.
  CPC ............. *B29C 47/36* (2013.01); *B29C 47/364* (2013.01); *B29C 47/367* (2013.01); *B29K 2021/00* (2013.01); *B29L 2031/001* (2013.01)

(58) Field of Classification Search
  CPC ....... B29C 47/36; B29C 47/364; B29C 47/367
  See application file for complete search history.

(56) References Cited

U.S. PATENT DOCUMENTS 4,209,476 A 6/1980 Harris
4,642,040 A * 2/1987 Fox ..................... B29C 47/0801
  264/176.1
(Continued)

FOREIGN PATENT DOCUMENTS

DE  90 04 535 U1  8/1990
FR  2 478 524 A1  9/1981
(Continued)

OTHER PUBLICATIONS

International Search Report, issued in PCT/JP2013/073401, dated Dec. 10, 2013.
(Continued)

*Primary Examiner* — Alison L Hindenlang
*Assistant Examiner* — Joseph Leyson
(74) *Attorney, Agent, or Firm* — Birch, Stewart, Kolasch & Birch, LLP (57) ABSTRACT

The present invention can save space. A rubber extrusion device (1) containing a rubber extruder (2) for kneading rubber and extruding same from a discharge port (7), and a gear pump (3) connected to the discharge port (7) of the rubber extruder (2). The rubber extruder (2) has a cylinder part (4), which houses a rubber extrusion screw (5), above the floor surface on which the rubber extruder (2) is placed. The gear pump (3) contains an electric motor (8), a decelerator (9) linked to the electric motor (8), and a gear pump main body (10) linked to the decelerator (9). A pair of gears (11) which meshes with one another is installed in the gear pump main body (10). The electric motor (8) and the decelerator (9) are disposed in a space below the gear pump main body (10) or the cylinder part (4). Moreover, the output shaft (9b) of the decelerator and one of the gears (11) are linked by means of a wrapping transmission means.

9 Claims, 7 Drawing Sheets

(56) References Cited

U.S. PATENT DOCUMENTS

| | | |
|---|---|---|
| 4,721,689 A | 1/1988 | Chaloux, Jr. et al. |
| 5,179,521 A | 1/1993 | Edge |
| 5,378,415 A | 1/1995 | Gohlisch et al. |
| 5,433,593 A * | 7/1995 | Berger .................. B29C 47/38 366/190 |
| 2003/0025238 A1 | 2/2003 | Ogawa |
| 2008/0265456 A1 | 10/2008 | Ogawa et al. |

FOREIGN PATENT DOCUMENTS

| | | |
|---|---|---|
| JP | 2003-33960 A | 2/2003 |
| JP | 2005-53190 A | 3/2005 |
| JP | 2007-1235 A | 1/2007 |
| JP | 2010-106673 A | 5/2010 |

OTHER PUBLICATIONS

Extended European Search Report issued Apr. 22, 2016, in European Patent Application No. 13833857.9.

* cited by examiner

RUBBER EXTRUSION DEVICE

TECHNICAL FIELD

The present invention relates to a rubber extrusion device that may achieve a space saving.

BACKGROUND ART

Figure 6A:
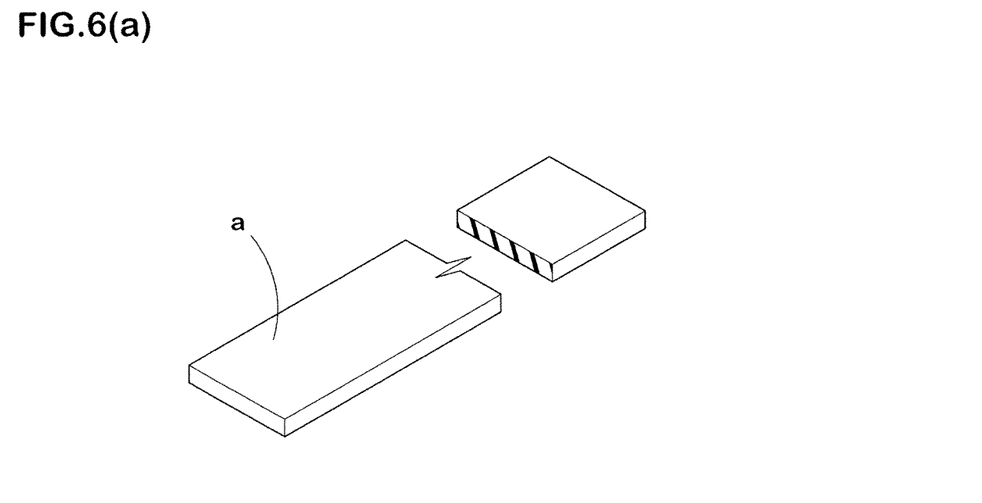
FIG. 6a is a perspective view of a rubber strip.
Figure 6B:
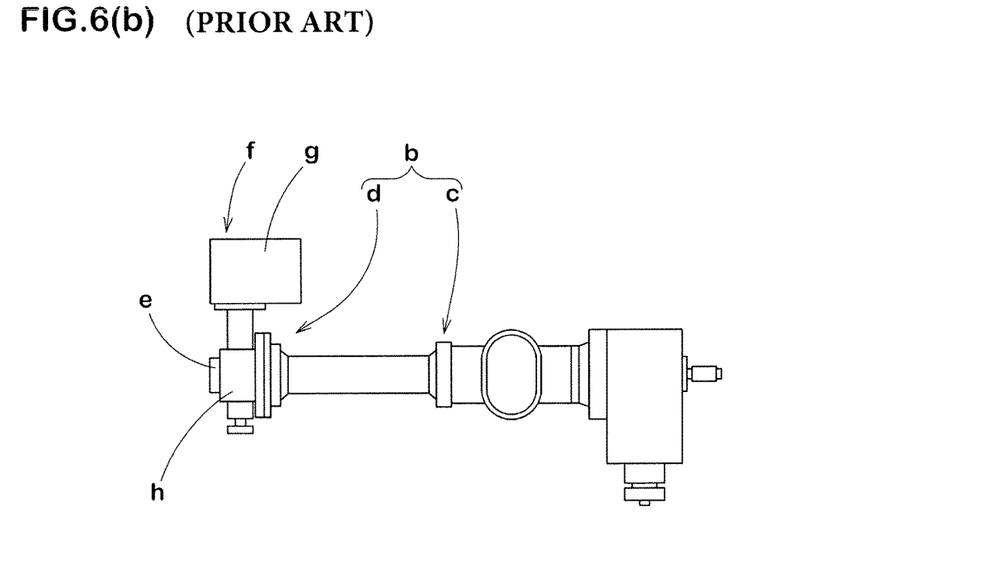
FIG. 6b is a plan illustrating a conventional rubber extrusion device.

Recently, as shown in FIG. 6(a), a method for producing a pneumatic tire where an unvulcanized ribbon-like rubber strip (a) is wound on an outer surface of a rigid core to form a green tire has been proposed. The rigid core has a shape similar an inner cavity of the pneumatic tire to be manufactured. In order to extrude the rubber strip (a), a rubber extrusion device (b) as shown in FIG. 6(b) has been proposed.

The rubber extrusion device (b) includes a rubber extruder (c) and a gear pump (d), for instance. The rubber extruder (c) is configured to have a screw shaft for kneading unvulcanized rubber and ext riling the same. The gear pump (d) is configured to include a gear pump main body (h) that comprises an electric motor (f), a reduce (g) linked to the electric motor (f), and a pair of gears. The gear pump (d) receives extruded rubber from the rubber extruder and then may quantitatively discharge it. The gear pump (d) includes an outlet port (e) for discharging a preliminary rubber strip. To form rubber strip (b), the preliminary rubber strip may further be pressed between a pair of calendar rolls.

Figure 7:
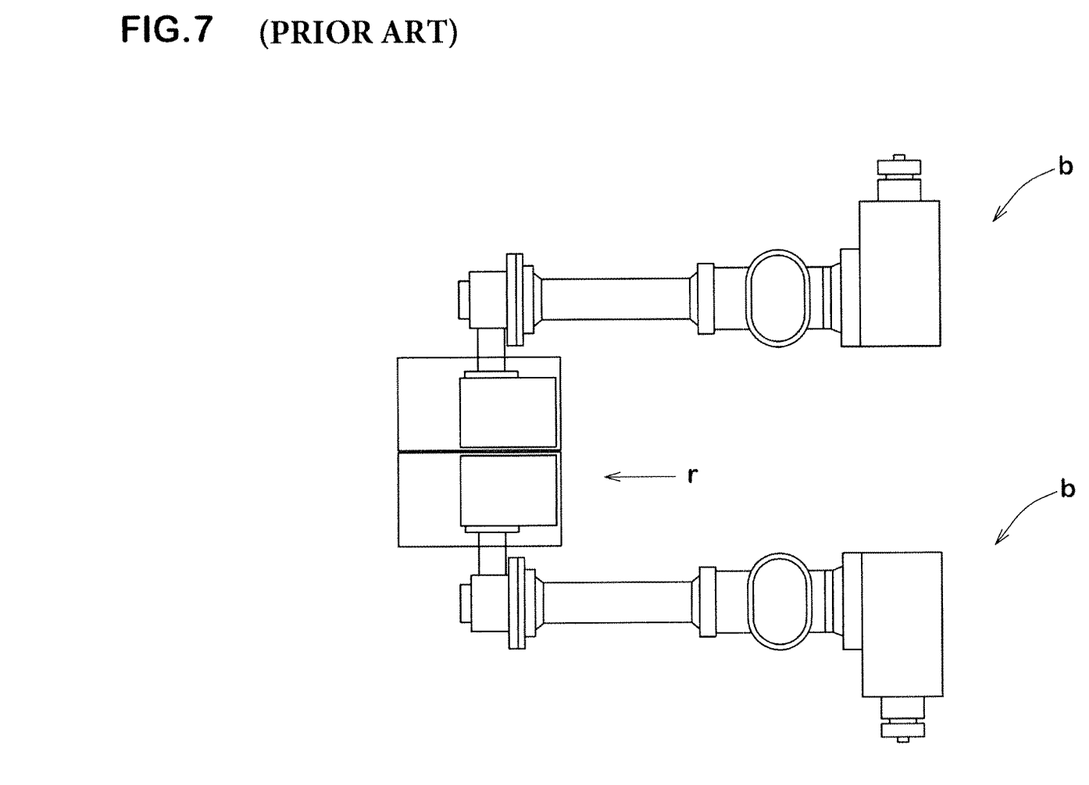
FIG. 7 is a plan view illustrating a pair of parallelly arranged conventional rubber extrusion devices.

Unfortunately, since the conventional rubber extrusion device (b) includes three parallel axes, i.e. a rotating shaft of the electric motor (f), an output shaft of the reducer (g), and rotating axes of gears, the electric motor (f) and the reducer (g) have to be arranged laterally outside the gear pump rain body (h). Thus, to install the rubber extrusion device on the floor, a large plane space is necessary. In particular, as shown in FIG. 7, when two rubber extrusion devices (b) are arranged in parallel one another, there is a problem that further larger space is necessary. The relevant a prior arts are as follows.

RELATED ART DOCUMENTS

Patent Documents

[Patent Document 1] Japanese Unexamined Patent Application Publication 2005-53190

SUMMARY OF THE INVENTION

Problem to be Solved by the Invention

The present invention has been worked out in the light of the circumstances described above, and has a main object of providing a rubber extrusion device that may achieve a space saving based on an improved layout where an electric motor and a reducer of a gear pump are arranged in a space below a cylinder portion of a rubber extruder or a gear pump main body.

Means for Solving the Problem

In accordance with the present invention, there is provided a rubber extrusion device comprising a rubber extruder for kneading rubber and extruding the same from a discharging port, and a gear pump connected to the discharging port of the rubber extruder, the rubber extruder comprising a cylinder portion arranged above a floor on which the rubber extruder is placed, and a rubber extrusion screw installed in the cylinder portion, the gear pump comprising an electric motor, a reducer linked to the electric motor and having an output shaft, and a gear pump main body linked to the reducer, the gear pump main body comprising a chamber having an inlet port for receiving rubber extruded from the rubber extruder, and an outlet port for discharging rubber out from the gear pump, and a pair of gears meshing one another installed in the chamber for pumping rubber toward the outlet port, the gear pump main body fixed to the cylinder portion of the rubber extruder so that the inlet port is adjusted to the discharging port of the rubber extruder, the electric motor and the reducer being arranged in a space below the cylinder portion or the gear pump main body, and a wrapping transmission means for linking between the output shaft of the reducer and one of the gears.

In another aspect of the invention, the electric motor comprises a rotating shaft arranged in parallel with an axial direction of the cylinder portion, the gears are arranged so that the respective rotating axes of the gears and the cylinder portion are cross at right angles, and the reducer comprises a rotation direction changing device for transmitting torque generated from the rotating shaft to the gears by changing a direction of the torque.

In another aspect of the invention, the wrapping transmission means is a chain or a belt.

In other aspect of the invention, the electric motor and the reducer are fixed to the floor, and the gear pump main body and the reducer are connected through a support member.

Effect of the Invention

A rubber extrusion device in accordance with the present invention comprises a rubber extruder for kneading rubber and extruding the same from a discharging port, and a gear pump connected to the discharging port of the rubber extruder. The rubber extruder comprises a cylinder portion arranged above a floor on which the rubber extruder is placed. The cylinder portion includes a rubber extrusion screw installed therein. The gear pump comprises an electric motor, a reducer linked to the electric motor and having an output shaft, and a gear pump main body linked to the reducer. The gear pump main body comprises a chamber having an inlet port for receiving rubber extruded from the rubber extruder, and an outlet port for discharging rubber out from the gear pump, and a pair of gears meshing one another installed in the chamber for pumping rubber toward the outlet port. The gear pump main body is fixed to the cylinder portion of the rubber extruder so that the inlet port is adjusted to the discharging port of the rubber extruder.

The electric motor and the reducer are arranged in a space below the cylinder portion or the gear pump main body. Although the space below the cylinder portion or the gear pump main body of a conventional rubber extrusion device was a dead space, the rubber extrusion device in accordance with the present invention may effectively utilize such a dead space. Thus, the rubber extrusion device can be miniaturized so as to achieve a space saving. Furthermore since the output shaft of the reducer that is arranged in the space below the cylinder portion or the gear pump main body is linked to one of the gears using a wrapping transmission means, the gear pump can be properly driven.

MODE FOR CARRYING OUT THE INVENTION

Figure 1:
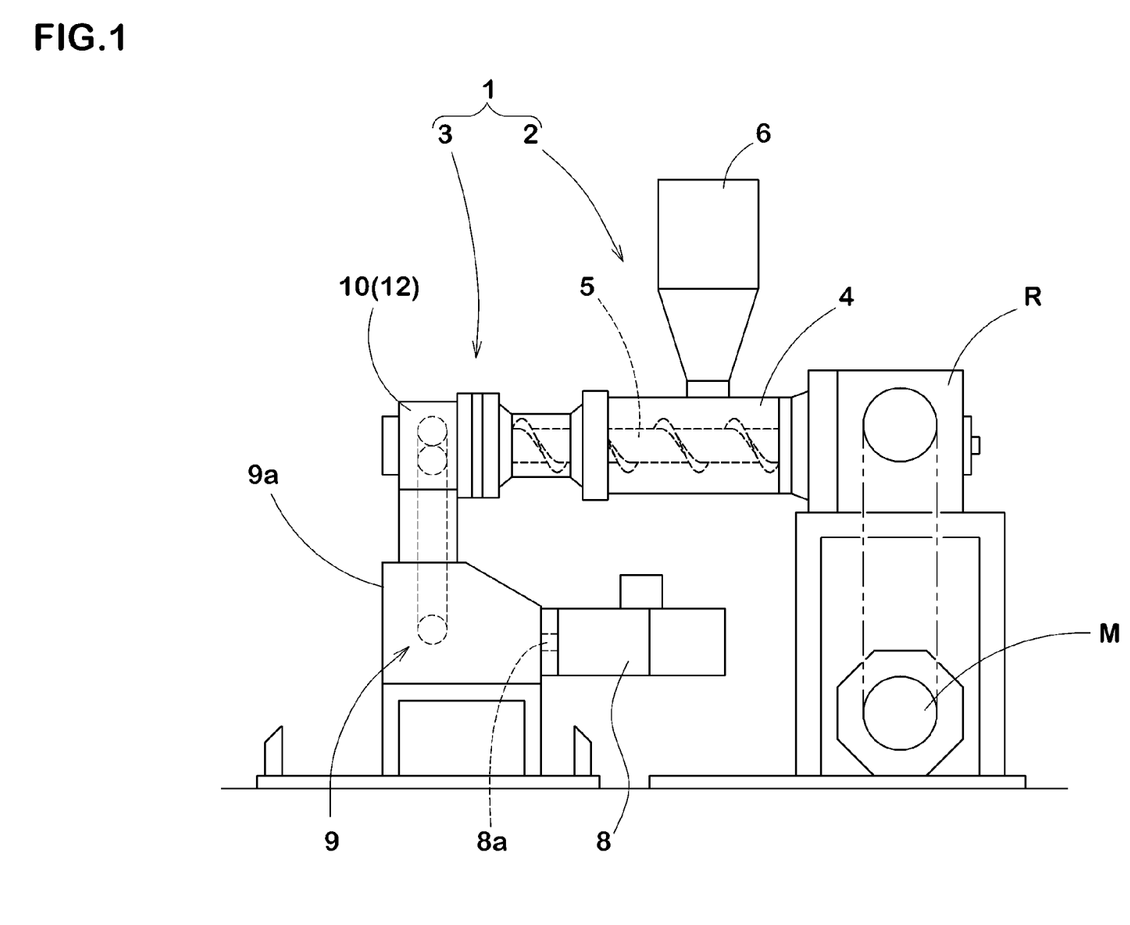
FIG. 1 is a front view illustrating a rubber extrusion device in accordance with an embodiment of the present invention.
Figure 2:
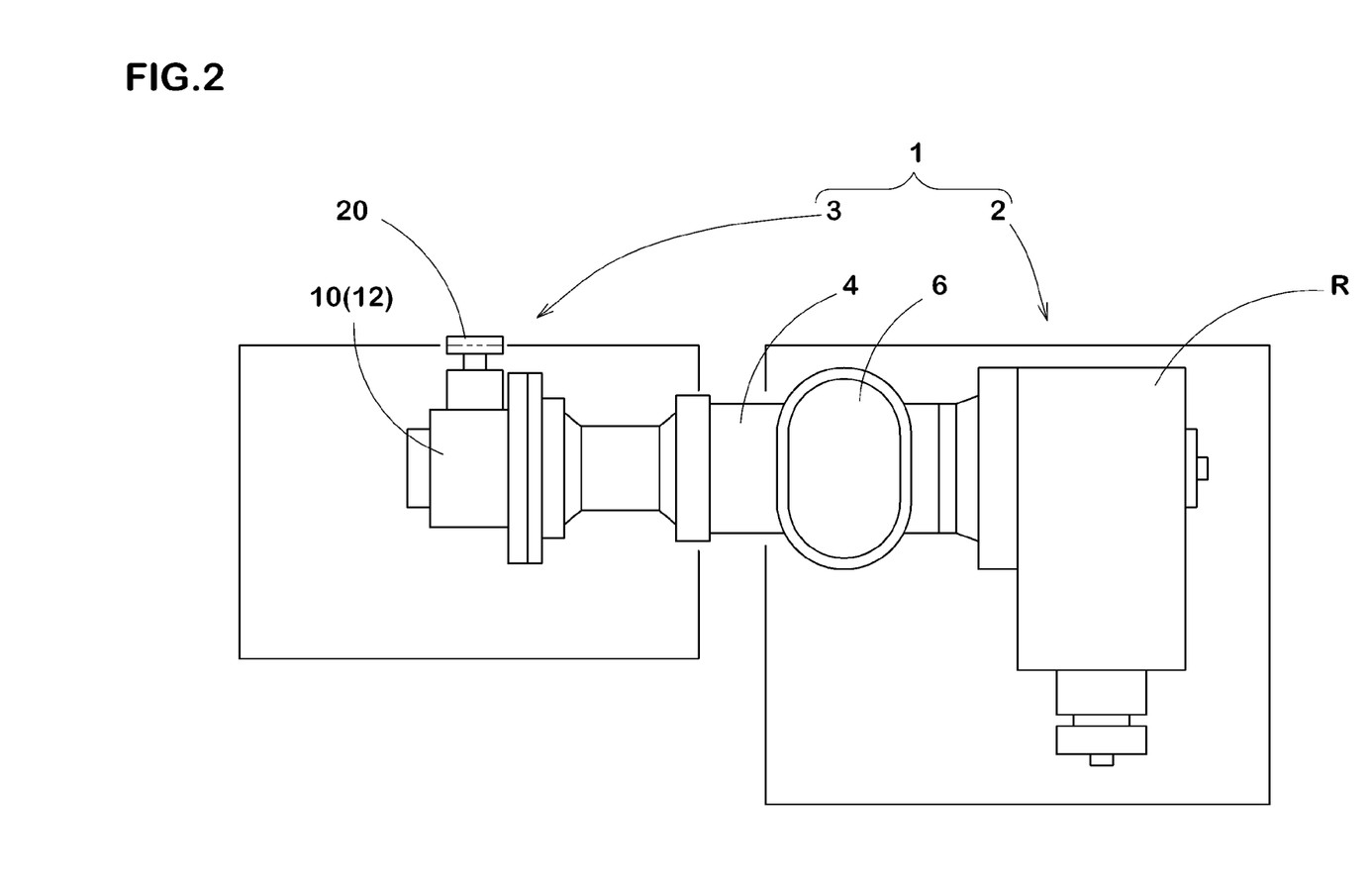
FIG. 2 is a plan view of the rubber extrusion device of FIG. 1.
Figure 3:
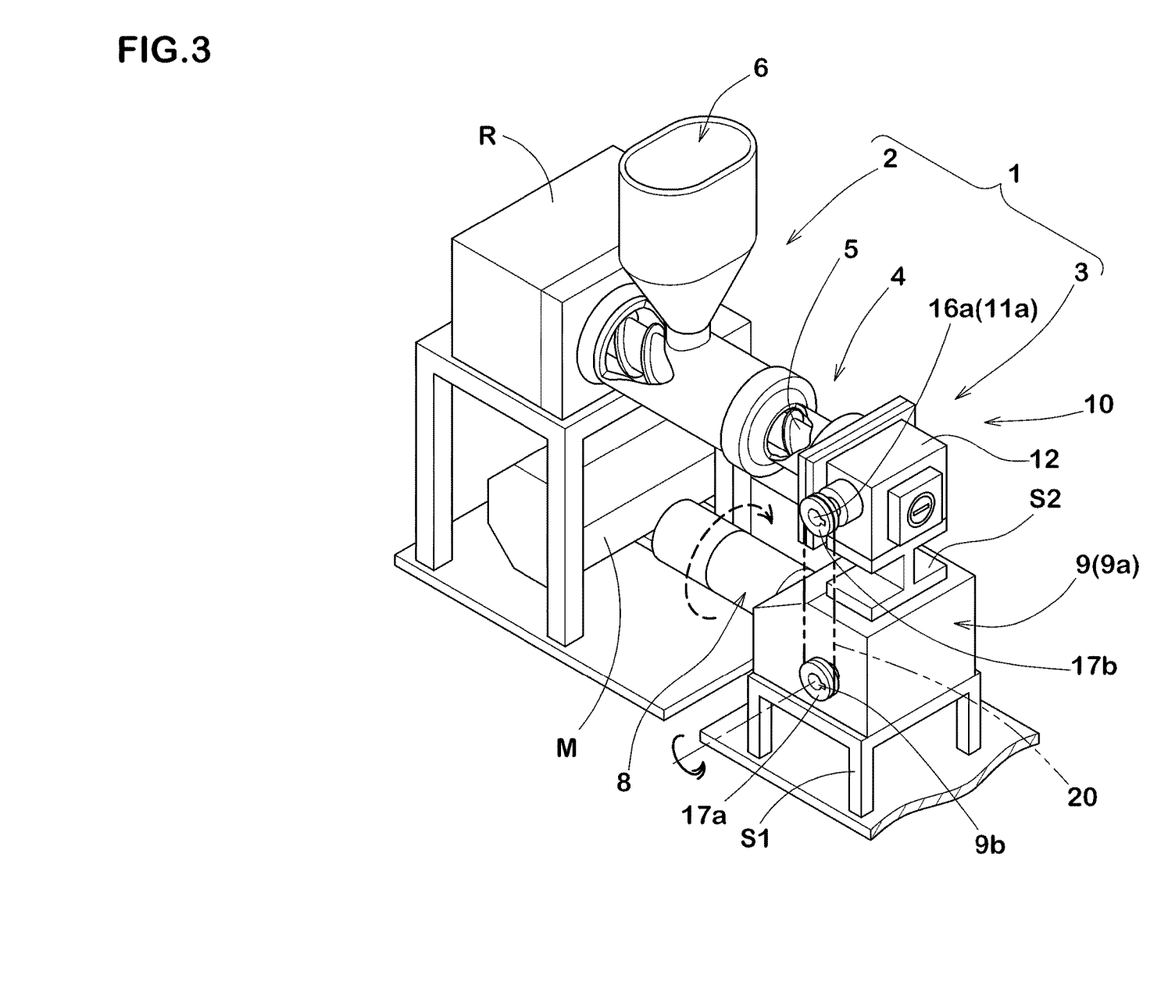
FIG. 3 is a perspective view of the rubber extrusion device of FIG. 1.

An embodiment of the present invention will be explained below reference to the accompanying drawings. As shown in FIGS. 1 to 3, a rubber extrusion device 1 in accordance with the present embodiment may knead unvulcanized rubber G (shown in FIG. 4) and extrude the same so as to form a continuously long ribbon-like rubber strip GS (shown in FIG. 4). On a certain downstream place of the rubber extrusion device 1, a rigid core (not shown) that has an outer surface similar to an inner cavity of a pneumatic tire to be manufactured can be provided. The rubber strip GS can be wound on the outer surface of the rigid core to form a green tire thereon.

The rubber extrusion device 1 in accordance with the present embodiment includes a rubber extruder 2 for extruding unvulcanized rubber, and a gear pump 3 linked to the rubber extruder 2.

The rubber extruder 2 includes a cylinder portion 4 including a screw shaft 5 therein, an electric motor M for driving the screw shaft 5, and a reducer R for the screw shaft for transmitting torque of the motor M to the screw shaft 5.

Figure 4:
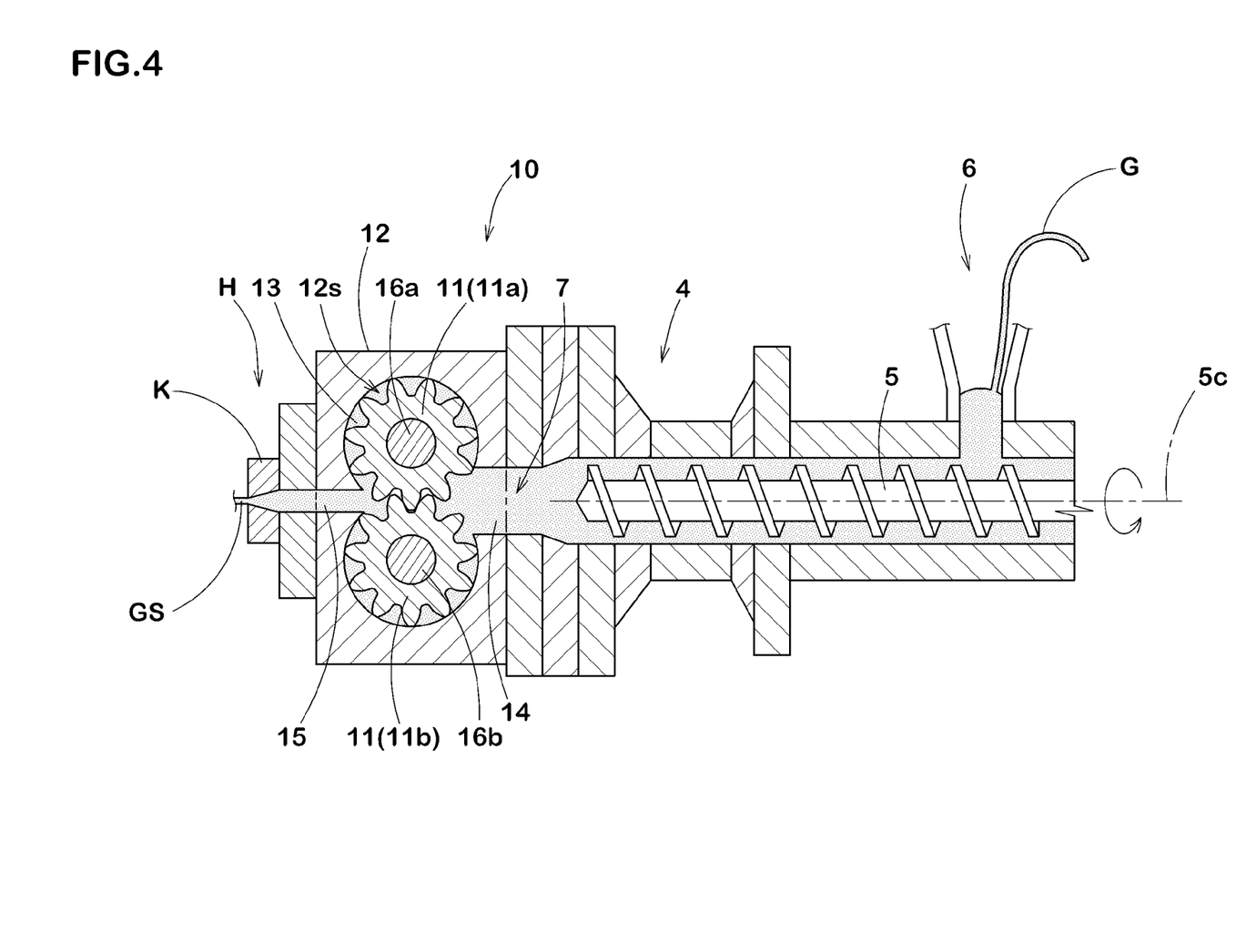
FIG. 4 is a cross sectional view of a cylinder portion and a gear pump main body.

FIG. 4 illustrates a cross sectional view of the cylinder portion 4 and a gear pump main body 10. As shown in FIG. 4, the cylinder portion 4 is provided with an inlet 6 for insertion of rubber at its upstream side, and a discharging port for extruding kneaded rubber G at its downstream side. Rubber inserted from the inlet 6 into the cylinder portion 4 is kneaded and pushed forward by the screw shaft 5, and then is continuously extruded from the discharging port 7.

Preferably, the rubber G is preformed into a continuous sheet body by a calendar (not shown) and then provided to the cylinder portion 4. The discharging port 7 may have any opening shape such as rectangular, circular and elliptical shapes.

As shown in FIGS. 1 to 3, the gear pump 3 comprises an electric motor 8, a reducer 19 linked to the electric motor 8, and the gear pump main body 10 linked to the reducer 9. As for the electric motor 8, a conventional one may be employed.

As shown in FIG. 4, the gear pump main body 10 includes a substantially rectangular casing 12 that defines a chamber 12s where the rubber G flows. The chamber 12s includes a gear storage space 13 for arranging a pair of meshing gears 11, an inlet port 14 for receiving the rubber G extruded from the rubber extruder 2, and an outlet port 15 for discharging the rubber G out from the gear pump.

The inlet port 14 may have any opening shape such as rectangular, circular and elliptical shapes. Preferably, the inlet port 14 may have the same opening shape with the discharging port 7. The outlet port 15 may have any opening shape such as rectangular, circular and elliptical shapes.

The gear pump main body 10 is fixed to the cylinder portion 4 so that the inlet port 14 of the chamber 12s is connected with the discharging port 7, The outlet port 15 of the chamber 12s is provided with an extrusion head H that includes a die plate K to form the kneaded rubber G into a rubber strip GS with a certain cross sectional shape.

In this embodiment, the gears 11 includes an upper gear 11a and a lower gear 11b arranged below the upper gear 11a. In this embodiment, the gears 11 are spur gears. In another aspect, helical gears or double-helical gears may be employed, for example.

Both of the upper gear 11a and the lower gear 11b have horizontal rotating axes 16a and 16b respectively which cross at right angle with respect to a rotating center axis 5c of the screw shaft 5. The rotating axis 16b of the lower gear 11b is rotatably supported by the casing 12. In this embodiment, as shown in FIG. 3, the rotating axis 16a of the upper gear 11a extends so as to protrude outside the side face of the casing 12.

In the gear pump main body 10, the gears 11 are rotated one another in reverse by being driven the rotating axis 16a of the upper gear 11a. Thus, the rubber in the chamber 12s is forced to the outlet port 15 from the inlet port 14.

As shown in FIGS. 1 to 3, the electric motor 8 is arranged in a space below the cylinder portion 4. Furthermore, the reducer 9 is arranged in a space below the cylinder portion 4 and the gear pump main body 10. In a conventional extruder device, the space below the cylinder portion 4 was a dead space. In this embodiment, such a dead space may be utilized effectively. Thus, the present embodiment may offer a small sized rubber extruder device 1 that may achieve a space saving.

The electric motor 8 includes a rotating shaft 8a that is arranged in parallel with the rotating center axis 5c of the screw shaft 5 disposed in the cylinder portion 4. Accordingly, the rotating axis 16a of the upper gear 11a is arranged so as to cross at right angles to the rotating shaft 8a of the electric motor 8.

In this embodiment, the reducer 9 is arranged in a casing 9a. The reducer 9 includes a rotation direction changing device (not shown) for transmitting torque generated from the rotating shall 8a to the gears 11 by changing a direction of the torque. In this embodiment, the rotation direction changing device may change the direction of torque of the rotating shaft 8a of the electric motor 8 at 90 degrees around a vertical axis. Thus, the output shaft 9b of the reducer 9 is arranged so as to be parallel with the rotating axis 16a of the upper gear 11a. For the reducer 9 having the rotation direction changing device, a roller gear reducer having a conventional structure may preferably be employed.

In this embodiment, sprockets 17a and 17b are fixed to the output shaft 9b of the reducer 9 and the rotating axis 16a of the upper gear 11a, respectively. A wrapping transmission means, e.g. a chain 20 is wound between the sprockets 17a and 17b. Thus, a torque generated from the electric motor 8 that is arranged in a space below the cylinder portion 4 or the gear pump main body 10 is transmitted to the gears 11 of the gear pump main body 10. Accordingly, the gear pump 3 is driven to extrude the rubber strip GS (shown in FIG. 4).

As for the wrapping transmission means, the chain 20 is preferably employed in this embodiment. In another aspect of the wrapping transmission means, a combination of a belt and a pair of pulleys may be employed.

Figure 5:
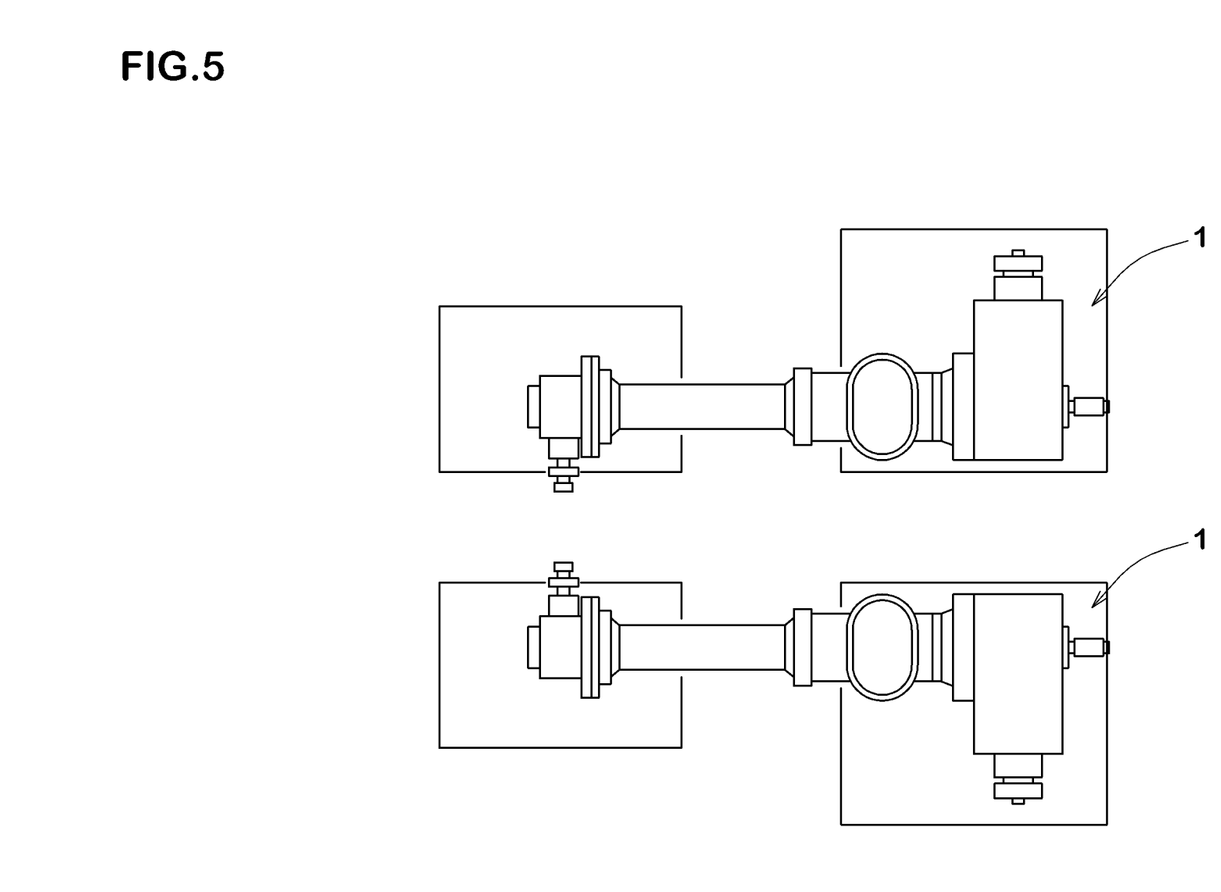
FIG. 5 is a plan view of a pair of parallelly arranged rubber extrusions in accordance with an embodiment of the present invention.

FIG. 5 illustrates a plan view of a pair of parallelly arranged rubber extrusion devices 1 in accordance with the present embodiment. Referring to FIG. 5, the rubber extrusion device 1 in accordance with the present embodiment may achieve a space saving in a direction perpendicular to an extruding direction in a plan view as compared to the two conventional rubber extruder devices arranged in parallel shown in FIG. 7.

As shown in FIG. 3, the electric motor 8 and the reducer 9 are fixed on a table S1 fixed on the floor, for example. In addition, the gear pump main body 10 is arranged on the reducer 9 through a support member S2.

While the particularly preferable embodiments of the present invention have been described in detail, the present invention is not limited to the illustrated embodiments, but can be modified and carried out in various aspects. For instance, the rubber extrusion device in accordance with the present embodiment is not particularly limited to form a rubber strip, but can be employed for forming a various kinds of rubber products.

DESCRIPTION OF THE REFERENCE NUMERALS

1 Rubber extruder device
2 Rubber extruder
3 Gear pump
4 Cylinder portion
5 Screw shaft
7 Discharging port
8 Electric motor
9 Reducer
9b Output shaft
10 Gear pump main body
11 Gears

The invention claimed is:

1. A rubber extrusion device comprising:
a rubber extruder for kneading rubber and extruding the same from a discharging port and a gear pump connected to the discharging port of the rubber extruder;
the rubber extruder comprising a cylinder portion arranged above a floor on which the rubber extruder is placed, a rubber extrusion screw installed in the cylinder portion and a first electric motor for driving the screw;
the gear pump comprising a second electric motor, a reducer linked to the second electric motor and having an output shaft and a gear pump main body linked to the reducer;
the gear pump main body comprising a chamber having an inlet port for receiving rubber extruded from the rubber extruder and an outlet port for discharging rubber out from the gear pump, and a pair of gears meshing one another installed in the chamber for pumping rubber toward the outlet port;
the gear pump main body fixed to the cylinder portion of the rubber extruder so that the inlet port is adjusted to the discharging port of the rubber extruder;
the second electric motor and the reducer being arranged in a space below the cylinder portion or the gear pump main body wherein the second motor comprises a rotating shaft arranged in parallel with an axial direction of the cylinder portion of the rubber extruder; and
the gear pump further comprising wrapping transmission means for linking between the output shaft of the reducer and one of the gears.

2. The rubber extrusion device according to claim 1, wherein the gears are arranged so that the respective rotating axes of the gears and the cylinder portion are cross at right angles, and
the reducer comprises a rotation direction changing device for transmitting torque generated from the rotating shaft to the gears by changing a direction of the torque.

3. The rubber extrusion device according to claim 1, wherein the wrapping transmission means is a chain or a belt.

4. The rubber extrusion device according to 1, wherein the second electric motor and the reducer are fixed to the floor, and
the gear pump main body and the reducer are connected through a support member.

5. The rubber extrusion device according to claim 2, wherein the wrapping transmission means is a chain or a belt.

6. The rubber extrusion device according to claim 2, wherein the second electric motor and the reducer are fixed to the floor, and
the gear pump main body and the reducer are connected through a support member.

7. The rubber extrusion device according to claim 3, wherein the second electric motor and the reducer are fixed to the floor, and
the gear pump main body and the reducer are connected through a support member.

8. The rubber extrusion device according to claim 1, wherein the second electric motor is covered entirely with the cylinder portion of the rubber extruder in a plan view of the extrusion device.

9. The rubber extrusion device according to claim 7, wherein the second electric motor is covered entirely with the cylinder portion of the rubber extruder in a plan view of the extrusion device.

* * * * *